(12) United States Patent
Vanhee

(10) Patent No.: US 12,034,352 B2
(45) Date of Patent: Jul. 9, 2024

(54) COOLING JACKET ASSEMBLY FOR COOLING A ROTATING MACHINE WITH FLOW GUIDING AND REFLECTOR ELEMENTS

(71) Applicant: Dana Belgium N.V., Bruges (BE)

(72) Inventor: Steven Vanhee, Staden (BE)

(73) Assignee: DANA BELGIUM N.V., Bruges (BE)

( * ) Notice: Subject to any disclaimer, the term of this patent is extended or adjusted under 35 U.S.C. 154(b) by 974 days.

(21) Appl. No.: 17/015,827

(22) Filed: Sep. 9, 2020

(65) Prior Publication Data

US 2021/0083547 A1    Mar. 18, 2021

(30) Foreign Application Priority Data

Sep. 12, 2019 (EP) .................................. 19197115

(51) Int. Cl.
*H02K 5/20* (2006.01)
*H02K 5/18* (2006.01)
*H02K 9/19* (2006.01)

(52) U.S. Cl.
CPC ................ *H02K 5/20* (2013.01); *H02K 5/18* (2013.01); *H02K 9/19* (2013.01)

(58) Field of Classification Search
CPC ........... H02K 5/20; H02K 5/203; H02K 1/20; H02K 5/18; H02K 5/19
See application file for complete search history.

(56) References Cited

U.S. PATENT DOCUMENTS

| | | |
|---|---|---|
| 5,111,090 A | 5/1992 | Otake et al. |
| 8,169,110 B2 | 5/2012 | Swales et al. |
| 2001/0035651 A1 * | 11/2001 | Umemoto ............... F03D 80/60 416/41 |
| 2003/0102728 A1 | 6/2003 | Chen et al. |
| 2005/0151431 A1 | 7/2005 | Cronin et al. |
| 2008/0100159 A1 * | 5/2008 | Dawsey .................... H02K 1/20 310/59 |
| 2011/0234029 A1 * | 9/2011 | Pal ........................... H02K 1/20 310/54 |
| 2019/0006914 A1 * | 1/2019 | Graves ................. F16H 57/0457 |

FOREIGN PATENT DOCUMENTS

| | | | | |
|---|---|---|---|---|
| CN | 109194035 A | * | 1/2019 | ............... H02K 1/20 |
| EP | 2738915 A2 | * | 6/2014 | ............... H02K 9/08 |
| JP | 2009254197 A | * | 10/2009 | |
| JP | 2012222904 A | * | 11/2012 | |

OTHER PUBLICATIONS

Chen (CN 109194035 A) English Translation (Year: 2019).*
Heiden (EP 2738915 A2) English Translation (Year: 2014).*
Kitahata (JP 2009254197 A) English Translation (Year: 2009).*
Kato (JP 2012222904 A) English Translation (Year: 2012).*

* cited by examiner

*Primary Examiner* — Tulsidas C Patel
*Assistant Examiner* — Robert E Mates
(74) *Attorney, Agent, or Firm* — McCoy Russell LLP

(57) ABSTRACT

A cooling jacket surrounding the stator of an electric machine, having an inlet and a plurality of outlets disposed at ends of the cooling jacket, distributed in circumferential direction and configured to create liquid jets exiting the cooling jacket in a radial direction towards end windings at the axial ends of the machine. Coolant liquid flow guiding elements within the cooling jacket are configured so as to create a circumferentially homogeneous or more homogenous axial liquid flow towards the liquid outlets and/or towards the liquid jet devices.

18 Claims, 2 Drawing Sheets

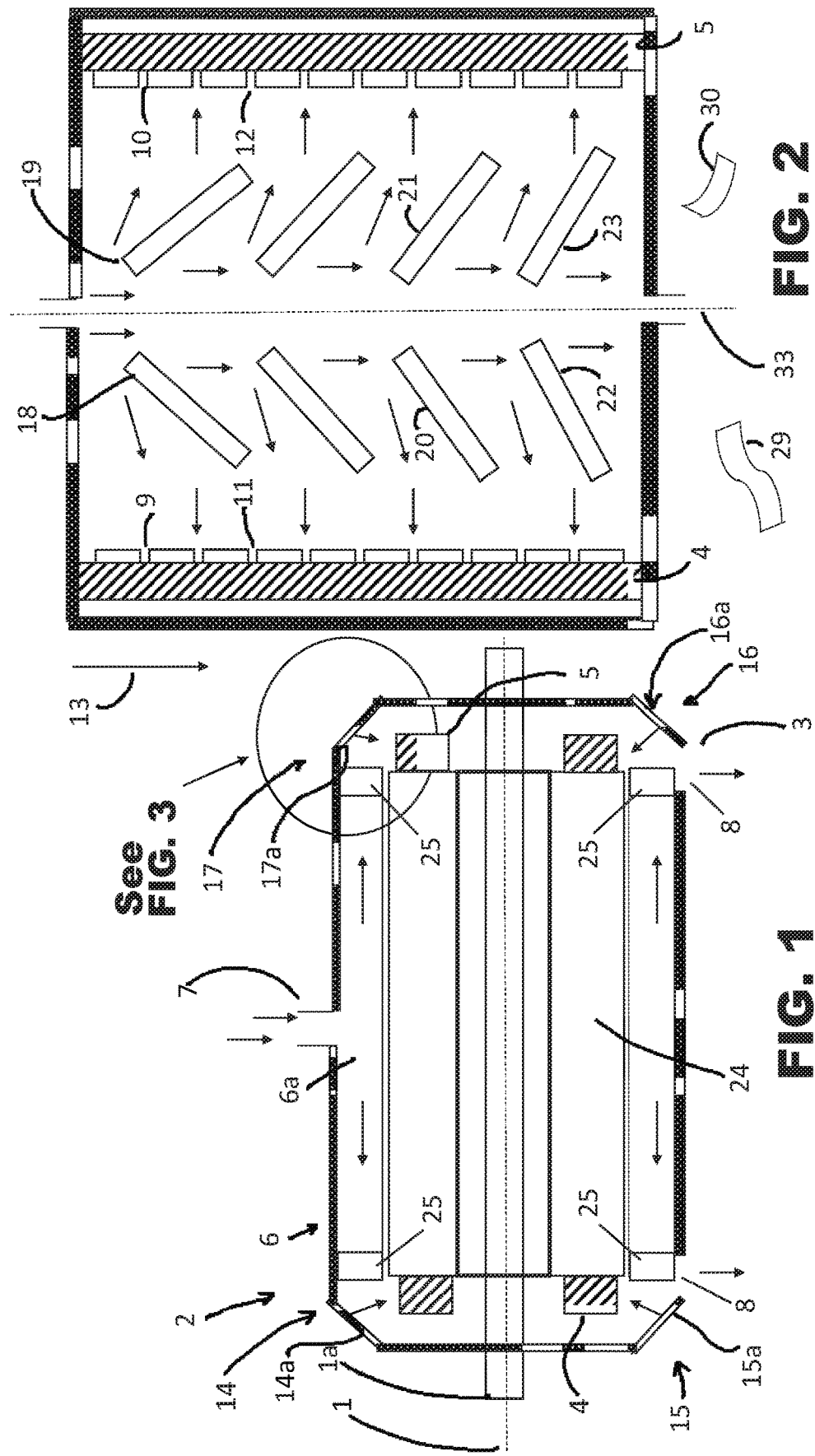

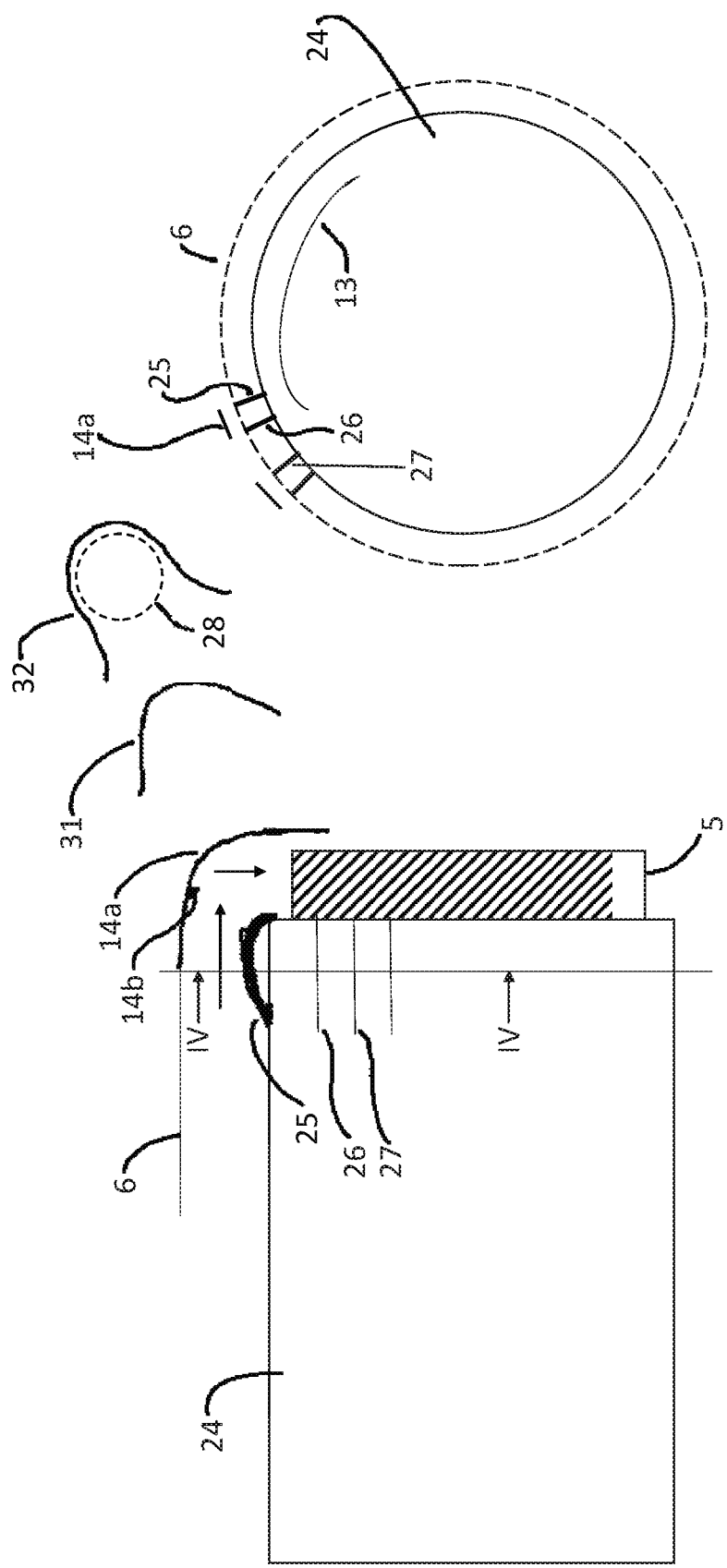

COOLING JACKET ASSEMBLY FOR COOLING A ROTATING MACHINE WITH FLOW GUIDING AND REFLECTOR ELEMENTS

CROSS-REFERENCE TO RELATED APPLICATION

The present application claims priority to European Patent Application No. 19197115.9, entitled "COOLING ASSEMBLY FOR COOLING A ROTATING MACHINE", and filed on Sep. 12, 2019. The entire contents of the above-listed application are hereby incorporated by reference for all purposes.

BACKGROUND AND SUMMARY

Rotating machines like electric generators, electric motors or other kinds of motors usually are converting one form of energy into another form. Part of the converted energy usually is also converted into thermal energy thereby raising the temperature of the rotating machine. This effect is generally not avoidable due to limited efficiencies. Improvements in performance of all kinds of machines, including electric motors used in domestic appliances or in automotive technology, lead to higher requirements and higher thermal loads. Also, higher power levels of electric motors and generators lead to higher operational temperatures.

As a result, more efficient cooling mechanisms have to be developed which include as one solution, for example, oil cooling or cooling by other liquids.

It is well known to use for motor cooling so called oil jackets or cooling jackets which are usually formed by hollow cylindrical containers for a cooling liquid wherein the containers usually are disposed around a stator of a machine like, for example, described in U.S. Pat. No. 5,111,090. Usually, such cooling jackets have a liquid inlet and a liquid outlet and the cooling liquid is moved between the inlet and the outlet around the circumference of the machine. Other examples of related cooling mechanisms are, for example, described in US 2005/0151431 A1 and in U.S. Pat. No. 8,169,110 B2.

In some of the exemplary mechanisms, like for example US 2003/0102728 A1, spray rings are provided at the axial ends of rotating machines in order to direct a jet of cooling liquid towards the ends of the machines where for example in the case of electric machines end windings are located. Usually, spray rings are fed by cooling liquid from separate pumps or pressure resources and spray rings comprise separate containers with a number of distributed nozzles to create uniform jets across the cross section of the machine. Such kinds of spray rings require a construction with additional elements that have to be put together in a fluid tight and pressure resistant manner.

One of the objectives of the present disclosure consists in providing an efficient liquid cooling for rotating machines wherein the axial ends of the machines can be cooled by a homogeneous flow of liquid. To this end, an efficient and effective construction shall be provided comprising a minimum of separate parts. Another objective of the present disclosure is to provide liquid cooling jets at the axial ends of the machines wherein the strength of the liquid flow is equally distributed along the circumference of the machine so that thermal hot spots are avoided.

The above problems according to the present disclosure are addressed by a cooling assembly for cooling a rotating machine with a rotational axis and a first and a second axial end, in particular a rotating electric machine with end windings, wherein the cooling assembly comprises: a cooling jacket surrounding the machine in circumferential direction for receiving and guiding a cooling liquid and, wherein the cooling jacket comprises at least one liquid inlet and a plurality of liquid outlets, the liquid outlets being disposed at at least one axial end of the cooling jacket, distributed in circumferential direction, and spaced apart from the liquid inlet in circumferential direction, the liquid outlets being configured to create one or more liquid jets exiting the cooling jacket at the liquid outlets, one or more liquid jet devices for application of the liquid jets in a radial direction towards an axial end of the machine, and liquid flow guiding elements for guiding a liquid inside the cooling jacket between the at least one liquid inlet and the liquid outlets, wherein the liquid flow guiding elements are configured to generate an axial liquid flow in an axial direction towards at least one liquid jet device at at least one axial end of the machine, and wherein each of the liquid jet devices comprises one or more flow reflector elements reflecting an axial liquid flow from the cooling jacket into a radial direction towards the axial end of the machine.

The cooling jacket surrounding the machine may have, in one exemplary implementation of the described embodiments, a hollow cylindrical form, wherein cooling liquid is led into the cooling jacket at at least one liquid inlet. Generally, the cooling liquid can flow inside the cooling jacket in axial and/or circumferential direction. Usually, the liquid is led out of the cooling jacket at one or more outlets. According to the present disclosure, one or more liquid outlets are disposed at one or more axial ends of the cooling jacket and the construction of the liquid outlets at the axial ends of the machine allows creating liquid jets exiting the cooling jacket. Respective liquid jet devices at the axial ends of the machine and neighboring or including the liquid outlets may direct the liquid jets in a radial direction towards an axial end of the machine, for example towards an end winding which is located at an axial end of the machine. In this context, a radial direction does not necessarily mean a direction which is strictly oriented towards the rotational axis of the machine but radial may mean any direction which is oriented from a first region located farther from the rotational axis towards a second region which is oriented closer to the rotational axis, i. e., the radial direction may comprise any direction which has a radial component or which has a radial component which is bigger than the other components of the direction. The liquid outlets are preferably located around the circumference of the machine at an axial end of the machine. Preferably, the liquid outlets are arranged at equal distances from one another. In another implementation of the present disclosure, the neighboring outlet dimensions may be variable along the circumference if this is a requirement for an equal distribution of the strength of radial flow jets, for example due to a pressure drop along the circumference of the machine or for an equal output velocity.

The liquid jet devices serve to apply liquid jets in a radial direction towards an end and/or an end winding of the machine and said liquid jet devices may comprise reflection surfaces which reflect a liquid jet into a radial direction or nozzles for generating radial jets or liquid flow guiding surfaces which are generating appropriate curls exiting the guiding surfaces in a radial direction.

In addition to the liquid outlets at the axial ends of the machine, also additional outlets at the circumference of the oil jacket/cooling jacket are possible (in this text, the expressions "oil jacket" and "cooling jacket" are used with the same meaning).

Inside the hollow space of the cooling jacket, liquid flow guiding elements are provided for guiding the liquid flow from the one or more inlets to the outlets. The liquid flow guiding elements are formed in an appropriate way to generate an equal strength of the liquid jets at the axial ends of the machine along the circumference of the machine. This can, for example, be achieved by generating an equal pressure distribution along the circumference of the machine at one or both axial ends. To this end, a stationary distribution of the liquid flow in the oil jacket can be achieved. In one implementation of the present disclosure, an appropriate liquid flow distribution can be achieved by varying either the distances between neighboring liquid flow guiding elements and/or the length of neighboring liquid flow guiding elements in axial and/or radial direction and/or varying the orientation of the liquid flow guiding elements with increasing distance from the liquid inlet in circumferential direction.

One additional implementation of the disclosure may provide that the cooling jacket comprises a hollow cylinder which coaxially surrounds a stator of an electric machine, wherein the hollow inner space of the hollow cylinder is filled with a cooling liquid.

The liquid flow guiding elements in the form of walls may reach from the inner cylinder of the cooling jacket to the outer cylinder or they may have the form of nose-pieces.

As already indicated above, one implementation of the disclosure may also provide that the liquid flow guiding elements are configured to create a circumferentially homogeneous or more homogenous axial liquid flow towards the liquid outlets and/or towards the liquid jet devices.

In one more concrete implementation of the liquid flow guiding elements, they are located inside the oil jacket and form walls which are straight, curved, or wriggled. This is meant for example in a view from the circumference towards the rotational axis.

One concrete implementation of the liquid flow guiding elements in the form of walls between the liquid inlet and the liquid outlets may provide that said flow guiding elements have different inclination angles between the longitudinal axis of each of the walls and the rotational axis of the machine. Therein, the longitudinal axis of a wall may mean the axis along their largest extension. In the case of a straight wall, its longitudinal axis is parallel to the longest outer sides. In the case of a curved or wriggled wall, the longitudinal axis may mean in the unfolded view of the oil jacket, a straight line starting at a first end of the wall and ending at the second end of the wall.

One potential implementation of the present disclosure may also provide that two or more liquid flow guiding elements in the form of walls are located between the liquid inlet and the liquid outlets, and wherein said flow guiding elements in the form of walls have different inclination angles between the longitudinal axis of each of the walls and the rotational axis.

Therein, a potential implementation may additionally provide that the inclination angle is decreasing from the liquid flow guiding element closest to the liquid inlet to the flow guiding element or to the flow guiding elements farthest from the liquid inlet.

As mentioned already above, it may also be provided that a distance between neighboring flow guiding elements varies in circumferential direction and/or that the flow guiding elements have varying lengths and/or varying widths.

It may also serve for generating an appropriate distribution of the liquid flow that the flow guiding elements are distributed irregularly in the axial direction and/or in the circumferential direction.

In yet another potential implementation of the present disclosure, it may be provided that each of the flow reflector elements comprises a reflector surface which is inclined with regard to the rotational axis and directs an axial flow into a radial flow, wherein the circumferential extension of each reflector surface about the rotational axis is between $\frac{1}{3}$ and $\frac{1}{500}$ of the circumference of the machine.

The respective reflector surfaces may be flat surfaces or surfaces that are at least flat in one section wherein the flat parts of the reflector surfaces have such an orientation that the rotational axis of the machine or a line which is parallel to the rotational axis cuts through such a flat reflector surface. If the reflector surfaces are curled, then at least one section of the respective reflector surfaces are inclined with regard to the rotational axis in the sense explained above. The curvature of such curved reflector surfaces is established at least in an axial cross section of the machine. The reflector surfaces may also be curved in an axial view so that each reflector surface forms a section of a ring around the rotational axis. The single reflector elements may be separate and positioned to each other in order to form a ring or they may form parts of a one-piece ring.

It may also be provided as one implementation of the described embodiments that the flow reflector elements are located next to each other and separated by fins or walls which extend parallel to the rotational axis, wherein the liquid outlets are formed in between neighboring fins or walls of said fins or walls.

The fins or walls may also form nozzles in-between them and the fins may not extend parallel to the rotational axis but inclined to the rotational axis. In this case, the liquid jets may have a first component in radial direction and a second component in circumferential direction at the axial end of the machine. By an inclination of the fins with regard to the rotational axis, it should be understood that in an unfolded view, the longitudinal axis of the single fins is inclined with regard to the rotational axis.

As explained above, it may also be provided as an implementation of the present disclosure that one or more flow reflector elements have a ring shape or the shape of a ring segment wherein the ring is coaxially surrounding the rotational axis and/or that each of the flow reflector elements has a reflector surface which is curved in an axial cross section of the machine.

Therein, it may also be provided as a special implementation that in an axial cross section of the machine, each of the flow reflector elements has a reflector surface which is curved and has the form of at least one quarter of a circle, so that the flow reflector element is forming a grooving. The reflector surface may also have, in the axial cross section, the form of between a quarter of a circle and a half-circle.

It should be mentioned that the expression reflector surface is meant to comprise a surface of a reflector element that reflects a liquid flow or a jet as well as a surface that guides a flow or a jet from a first direction towards a second direction.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The present disclosure will further be explained by some concrete examples of implementation which are also shown in figures. The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIG. 1 is a axial/longitudinal cross section through a rotating machine with an oil jacket/cooling jacket.

FIG. 2 is an unfolded view of an oil jacket with liquid jet devices at both axial ends.

FIG. 3 is an axial/longitudinal cross section of a rotating electric machine with liquid jet devices comprising flow reflector elements.

FIG. 4 an axial view of liquid jet devices including flow reflector elements as indicated in FIG. 3.

Similar reference numerals may have been used in different figures to denote similar components. FIGS. 1-4 are shown with components in proportional size with one another, according to some embodiments.

DETAILED DESCRIPTION

FIG. 1 shows in a longitudinal cross section an electric motor with a rotational axis 1, shaft 1a, and a central rotor surrounded by a stator 24, wherein the stator comprises electric windings. Only the end windings 4, 5 on both axial ends 2, 3 of the machine are shown. Further, the stator 24 is surrounded by a cooling jacket 6 which comprises a hollow cylindrical space 6a between an outer and an inner cylinder wall. The hollow cylinder space 6a is filled with a cooling liquid, for example a cooling oil. At the circumference of the cooling jacket 6, a liquid inlet 7 and further liquid outlets 8 are shown. As depicted in FIG. 1, the outlets 8 may be disposed at or near the axial ends of the electric motor. The arrows inside the cooling jacket 6 show in a symbolic way exemplary directions of the flow of the cooling liquid.

The cooling liquid is flowing through the cooling jacket partially in a circumferential direction and partially in axial directions. At the axial ends 2, 3 of the machine, liquid jet devices 14, 15, 16, 17 are provided wherein each of the liquid jet devices comprises flow reflector elements 14a, 15a, 16a, 17a. The flow reflector elements in FIG. 1 are shown in a symbolic way as flat elements that are inclined with regard to the rotating axis 1. The arrows representing the flow of the cooling liquid show that the flow is reflected at the flow reflector elements and directed in radial directions at both ends of the machine. The cooling liquid may further be guided by fins 25 which are disposed on a radially inward facing inner side of the cooling jacket 6 and which extend in parallel to the axis of rotation 1. The fins 25 are located at or near the axial ends of the stator 24. The detail at the right upper corner of FIG. 1 is shown with some variations in more detail in FIG. 3.

By redirecting the cooling liquid flow at the axial ends 2, 3 of the machine, the end windings 4, 5 can be provided with an intense radial flow from the circumference of the machine and thereby, the end windings can be cooled very efficiently.

FIG. 2 shows an unfolded view of the cooling jacket 6. On the top, the liquid inlet 7 is shown and at the bottom the liquid outlet 8. On both sides of the symmetry axis 33, liquid flow guiding elements 18, 19, 20, 21, 22, 23 are shown. They may be positioned and oriented in an axial symmetric way with regard to the axis 33 or in a non-symmetric way. In the concrete implementation shown in FIG. 2, the liquid flow guiding elements form straight walls in the hollow space 6a of the cooling jacket and reach from the inner cylinder of the cooling jacket 6 to the outer cylinder. The longitudinal axis of each of the walls is inclined with regard to axis 33 and includes with the axis 33 an angle between 0 degrees and 90 degrees or, for example, between 10 degrees and 80 degrees. The flow of the cooling liquid is indicated by arrows. The direction of the rotation of the machine is indicated by arrow 13.

At both sides of the unfolded view, i.e., at the axial ends of the rotating machine, the end windings 4, 5 are shown. Close to the end windings, liquid outlets 9, 10, 11, 12 are shown to which the flow of the cooling liquid is directed. The outlets 9, 10, 11, 12 are described in more detail below.

As an example of flow guiding elements which are not formed as straight walls, at the bottom of FIG. 2, two examples 29, 30 are shown wherein example 30 shows a curved wall while example 29 shows a form of a wriggled wall, seen from the circumference of the machine in a radial direction.

FIG. 3 shows in a longitudinal sectional view the stator 24 of the electric rotating machine of FIGS. 1 and 2. At one end, the end windings 5 are shown. At the upper part of the figure, the section of the cooling jacket 6 is shown and a flow of cooling liquid is indicated which goes through the cooling jacket to a liquid jet device 14 which comprises a flow reflector element 14a with an inner reflector surface 14b which is curved in the longitudinal cross section. Between the outer cylinder wall of the cooling jacket 6 and the inner wall of the cooling jacket, fins 25, 26, 27 are located which may be oriented in parallel to the longitudinal axis of the machine or inclined with regard to the longitudinal axis. The fins may reach from the inner cylinder wall of the cooling jacket to the outer cylinder wall or they may be just nose pieces on the inner cylinder wall. Liquid outlets are formed by and/or between the fins.

The liquid flow is reflected at the surface 14b of the flow reflector element 14a and directed in a radial direction towards the end winding 5.

In the shown example, the flow reflector element 14a comprises a quarter of a circle while an additional example of a flow reflector element 31 is shown which represents more than a quarter of a circle in the longitudinal cross section. A third example 32 of a flow reflector element shows nearly three quarters of a circle in the longitudinal cross section wherein an example of a full circle 28 is shown for the sake of comparison.

The forms of the flow reflector elements 31, 32 may allow a smoother change in direction of the liquid flow with lower losses in velocity of the flow.

FIG. 4 shows a view of the electric machine as shown in FIG. 3 but seen in a longitudinal/axial direction as indicated by the arrows IV-IV in FIG. 3. The stator of the machine is indicated as 24 and the circumferential direction as 13. Between the stator 24 and the outer cylinder of the cooling jacket 6, fins 25, 26 are indicated in a symbolic way wherein the fins may reach from the inner cylinder of the cooling jacket to the outer cylinder or they may just fill part of the space between the inner cylinder and the outer cylinder of the cooling jacket. The reflector element 14a is shown which forms part of a ring surrounding the stator 24 of the machine as indicated in FIG. 3. The separate flow reflector elements 14a together may form a ring surrounding the cooling jacket and/or the stator 24 or they may just prolongate the outer cylinder wall of the cooling jacket in axial direction of the machine.

In FIGS. 3 and 4, the liquid flow guiding elements have not been shown for the sake of simplicity.

By an appropriate location and orientation of the liquid flow guiding elements and an appropriate form of the flow reflector elements, a homogeneous flow of cooling liquid may be established from the circumference of the electric machine in a radial direction towards both end windings of the machine.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Throughout this specification relative language such as the words 'about' and 'approximately' may be used. Unless otherwise specified or described, this language seeks to incorporate at least 10% variability to the specified number or range. That variability may be plus 10% or negative 10% of the particular number specified.

The foregoing description is considered as illustrative only of the principles of the described embodiments. Further, since numerous modifications and changes will readily occur to those skilled in the art, it is not desired to limit the described embodiments to the exact construction and processes shown and described herein. Accordingly, all suitable modifications and equivalents may be considered as falling within the scope of the described embodiments as defined by the claims which follow.

The invention claimed is:

1. A cooling assembly for cooling an electric machine having a rotational axis, a first axial end, a second axial end, and end windings at the first and second axial ends, wherein the cooling assembly comprises:
a cooling jacket surrounding the machine in a circumferential direction for receiving and guiding a cooling liquid, wherein the cooling jacket comprises:
at least one liquid inlet,
a plurality of liquid outlets arranged at at least one axial end of the cooling jacket, distributed in the circumferential direction around the cooling jacket, and spaced apart from the liquid inlet in, an axial direction parallel with the rotational axis,
liquid flow guiding elements for guiding a liquid inside the cooling jacket between the at least one liquid inlet and the liquid outlets, the liquid flow guiding elements formed as a series of walls arranged in a partial circumference around the cooling jacket and arranged at an angle to the circumferential direction and the axial direction such that part of a circumferential fluid flow from the at least one liquid inlet collides with successive liquid flow guiding elements and is directed in an axial direction away from the at least one liquid inlet and towards at least one liquid jet device, and
one or more liquid jet devices at the liquid outlets, the one or more liquid jet devices formed by axially oriented passages which receive the axially oriented liquid flow from the liquid flow guiding elements and create one or more axially oriented liquid jets exiting the cooling jacket at the liquid outlets, each of the liquid jet devices comprising one or more flow reflector elements shaped to reflect the one or more liquid jets from the axial direction to a radial direction and the reflected flow extending around an axial end of the machine and flowing towards the rotational axis.

2. The cooling assembly according to claim 1, wherein the cooling jacket comprises a hollow cylinder which coaxially surrounds a stator of the machine, and wherein the hollow inner space of a hollow cylinder is filled with a cooling liquid.

3. The cooling assembly according to claim 1, wherein the liquid flow guiding elements are located inside the cooling jacket and form walls which are straight, curved, or wriggled.

4. The cooling assembly according to claim 3, wherein two or more liquid flow guiding elements in a form of walls are located between the at least one liquid inlet and the liquid outlets, and wherein said liquid flow guiding elements in the form of walls have different inclination angles between a longitudinal axis of each of the walls and the rotational axis.

5. The cooling assembly according to claim 4, wherein the inclination angle is decreasing from the liquid flow guiding element closest to the at least one liquid inlet to the flow guiding element or to the flow guiding elements farthest from the at least one liquid inlet.

6. The cooling assembly according to claim 1, wherein a distance between neighboring liquid flow guiding elements varies in the circumferential direction.

7. The cooling assembly according to claim 1, wherein the liquid flow guiding elements have varying lengths and/or varying widths.

8. The cooling assembly according to claim 1, wherein the liquid flow guiding elements are distributed irregularly in the axial direction and/or in the circumferential direction.

9. The cooling assembly according to claim 1, wherein each of the flow reflector elements comprises a reflector surface which is inclined with regard to the rotational axis and directs flow from the axial direction into the radial direction, and wherein a circumferential extension of each reflector surface about the rotational axis is between ⅓ and ¹⁄₅₀₀ of a circumference of the machine.

10. The cooling assembly according to claim 1, wherein restrictions of the one or more liquid jet devices is created by fins or walls disposed circumferentially around the cooling jacket and extending parallel to the rotational axis, and wherein the one or more liquid jet devices are formed in between neighboring fins or walls of said fins or walls.

11. The cooling assembly according to claim 1, wherein one or more flow reflector elements have a ring shape or a shape of a ring segment, and wherein the ring is coaxially surrounding the rotational axis.

12. The cooling assembly according to claim 11, wherein each of the flow reflector elements has a reflector surface which is curved in an axial section of the machine and the reflector surface redirects the liquid lets from the axial direction into the radial direction.

13. The cooling assembly according to claim 12, wherein in an axial section of the machine, each of the flow reflector elements has a reflector surface which is curved and has a form of at least one quarter of a circle, so that the flow reflector element is forming a grooving.

14. An electric machine comprising:
a stator positioned around a rotational axis of the machine;
end windings at axial ends of the stator; and
a cooling jacket surrounding the stator in a circumferential direction for receiving and guiding a cooling liquid, wherein the cooling jacket comprises:
at least one liquid inlets,
a plurality of liquid outlets, the liquid outlets being disposed at at least one axial end of the cooling jacket, distributed in the circumferential direction, and spaced apart from the at least one liquid inlet in an axial direction,
liquid flow guiding elements for guiding a liquid inside the cooling jacket between the at least one liquid inlet and the liquid outlets, the liquid flow guiding elements formed as a series of walls arranged in a partial circumference around the cooling jacket and arranged at an angle to the circumferential direction and the axial direction such that part of a circumferential fluid flow from the at least one liquid inlet collides with successive liquid flow guiding elements and is directed in an axial direction away from the at least one liquid inlet and towards the liquid outlets, and
one or more liquid jet devices at the liquid outlets, the one or more liquid jet devices formed by axially oriented passages which receive the axially oriented liquid flow from the liquid flow guiding elements and create one or more axially oriented liquid jets exiting the cooling jacket at the liquid outlets, each of the liquid jet devices comprising one or more flow reflector elements shaped to reflect the one or more liquid jets from the axial direction to a radial direction and the reflected flow extending around an axial end of the machine and flowing towards the rotational axis.

15. The machine of claim 14, wherein the liquid flow guiding elements are configured to create a circumferentially homogeneous or more homogenous axial liquid flow towards the liquid outlets and/or towards the liquid jet devices.

16. The machine of claim 14, wherein two or more liquid flow guiding elements in a form of walls are located between the at least one liquid inlet and the liquid outlets, and wherein said liquid flow guiding elements in the form of walls have different inclination angles between a longitudinal axis of each of the walls and the rotational axis.

17. The machine of claim 14, wherein each of the flow reflector elements comprises a reflector surface which is inclined with regard to the rotational axis and directs an axial flow into a radial flow, and wherein a circumferential extension of each reflector surface about the rotational axis is between ⅓ and ¹⁄₅₀₀ of a circumference of the machine.

18. The machine of claim 14, wherein the cooling jacket comprises fins or walls disposed on a radially inward facing inner side of the cooling jacket and extending parallel to the rotational axis, and wherein the liquid outlets are formed in between neighboring fins or walls of said fins or walls.

* * * * *